(12) United States Patent
Wakabayashi

(10) Patent No.: US 11,214,076 B2
(45) Date of Patent: Jan. 4, 2022

(54) PROCESSING SYSTEM

(71) Applicant: MIMAKI ENGINEERING CO., LTD., Nagano (JP)

(72) Inventor: Kazuaki Wakabayashi, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 0 days.

(21) Appl. No.: 16/822,020

(22) Filed: Mar. 18, 2020

(65) Prior Publication Data
US 2020/0298589 A1 Sep. 24, 2020

(30) Foreign Application Priority Data
Mar. 19, 2019 (JP) .............................. JP2019-050961

(51) Int. Cl.
*B41J 3/28* (2006.01)
*B41J 3/407* (2006.01)
*B41J 11/06* (2006.01)
*B41J 29/46* (2006.01)

(52) U.S. Cl.
CPC ............... *B41J 3/28* (2013.01); *B41J 3/4073* (2013.01); *B41J 11/06* (2013.01); *B41J 29/46* (2013.01)

(58) Field of Classification Search
CPC .................................................... B41J 3/4073
See application file for complete search history.

(56) References Cited

U.S. PATENT DOCUMENTS

| | | | |
|---|---|---|---|
| 9,827,784 B1* | 11/2017 | Buchar | B41J 2/04501 |
| 2012/0147074 A1* | 6/2012 | Ikeda | B41J 25/308 347/8 |
| 2013/0106938 A1 | 5/2013 | Yanagishita | |
| 2018/0079234 A1* | 3/2018 | Teets | B65H 1/266 |
| 2019/0366740 A1* | 12/2019 | Watanabe | B41J 11/06 |

FOREIGN PATENT DOCUMENTS

WO 2011024463 3/2011

OTHER PUBLICATIONS

"Search Report of Europe Counterpart Application", dated Aug. 14, 2020, p. 1-p. 8.

* cited by examiner

*Primary Examiner* — Shelby L Fidler
(74) *Attorney, Agent, or Firm* — JCIPRNET

(57) ABSTRACT

A processing system including an inkjet printer that performs printing on a workpiece according to print data associated with a jig ID that indicates the type of jig, and a jig having a jig ID indicating its type that supports the workpiece and is set in the inkjet printer acquires the jig ID from the jig (S61), and notifies incompatibility between the print data and the jig when the jig ID associated with the print data, and the jig ID acquired from the jig in S61 do not match (NO in S63) (S64).

14 Claims, 12 Drawing Sheets

46b Jig database

| Jig ID | Size of workpiece | | Maximum supporting number | Vertical maximum supporting number | Horizontal maximum supporting number | ... |
|---|---|---|---|---|---|---|
| | Vertical direction | Horizontal direction | | | | |
| 1 | 100 | 150 | 25 | 5 | 5 | ... |
| 2 | 200 | 250 | 20 | 4 | 5 | ... |
| 3 | 300 | 400 | 15 | 5 | 3 | ... |
| ... | ... | ... | ... | ... | ... | ... |

FIG. 5

46c Order status database

| Order ID | Print data | Jig ID | Final processing number | . . . |
|----------|------------|--------|-------------------------|-------|
| 1        |            | 3      | 200                     | . . . |
| 2        |            | 2      | 40                      | . . . |
| 3        |            | 1      | 100                     | . . . |
| .        | .          | .      | .                       | .     |
| .        | .          | .      | .                       | .     |
| .        | .          | .      | .                       | .     |

FIG. 6

PROCESSING SYSTEM

CROSS REFERENCE TO RELATED APPLICATIONS

This application claims the priority benefit of Japanese Patent Application No. 2019-050961, filed on Mar. 19, 2019. The entirety of the above-mentioned patent application is hereby incorporated by reference herein and made a part of this specification.

TECHNICAL FIELD

The present disclosure relates to a processing system that executes processing on a workpiece in accordance with processing data.

DESCRIPTION OF THE BACKGROUND ART

As a conventional processing system, a processing system including a printer that executes printing serving as processing on a medium serving as a workpiece according to print data serving as processing data, and a jig that supports the medium and is set with respect to the printer is known (see e.g., International Publication No. 2011/024463, i.e., Patent Literature 1).
Patent Literature 1: International Publication No. 2011/024463

SUMMARY

However, the conventional processing system has a problem in that there is a possibility printing is executed by the printer when the print data and the jig are incompatible. If printing is performed by the printer when the print data and the jig are incompatible, appropriate printing may not be performed on the medium, or a part of the printer, such as the print head of the printer, for example, may collide with the jig thus damaging at least one of the printer and the jig, which may lower the work efficiency of printing on the medium.

For example, the worker confirms memo writing and the like for each target printed matter and selects an appropriate jig from a plurality of types of jigs, whereby the work load for selecting an appropriate jig is large and an inappropriate jig may be selected by mistake. Furthermore, as the types of jigs that can be set in the printer increases more and more, the work load of the worker who selects an appropriate jig becomes larger, whereby a difference forms in the work efficiency between the skilled worker and the novice worker, and as a result, a difference forms in productivity of printed matter depending on the worker.

The present disclosure thus provides a processing system capable of suppressing execution of processing in a state where processing data and a jig are incompatible.

A processing system of the present disclosure relates to a processing system including a processing apparatus for performing processing on a workpiece according to processing data; a jig that supports the workpiece and is set in the processing apparatus; and an incompatibility notifying part that notifies incompatibility between the processing data and the jig, in which the jig includes jig identification information indicating the type of the jig itself, the processing system includes an information acquiring part that acquires the jig identification information from the jig, the processing data is associated with the jig identification information, and the incompatibility notifying part notifies the incompatibility when the jig identification information associated with the processing data does not match the jig identification information acquired from the jig by the information acquiring part.

With this configuration, the processing system of the present disclosure notifies the incompatibility between the processing data and the jig when the jig identification information associated with the processing data and the jig identification information acquired from the jig do not match, and thus the execution of processing in a state in which the processing data and the jig are incompatible can be suppressed.

The processing system of the present disclosure may further include a processing data accumulating part capable of accumulating a plurality of pieces of the processing data, in which the incompatibility notifying part may notify the incompatibility when, in a case where the jig identification information is acquired from the jig by the information acquiring part, the jig identification information associated with the processing data and the jig identification information acquired from the jig by the information acquiring part do not match with respect to all the processing data accumulated in the processing data accumulating part.

With this configuration, in a case where the jig identification information is acquired from the jig, the processing system of the present disclosure notifies the incompatibility between the processing data and the jig when the jig identification information associated with the processing data and the jig identification information acquired from the jig do not match with respect to all the processing data accumulated in the processing data accumulating part, and thus the worker can easily recognize that the jig should be replaced when the incompatibility between the processing data and the jig is notified, and as a result, the convenience can be enhanced.

In the processing system of the present disclosure, in a case where the jig identification information is acquired from the jig by the information acquiring part, the processing apparatus may execute processing according to the processing data to which the jig identification information acquired from the jig by the information acquiring part is associated of the processing data accumulated in the processing data accumulating part when the jig identification information associated with any processing data accumulated in the processing data accumulating part and the jig identification information acquired from the jig by the information acquiring part match.

With this configuration, the processing system according to the present disclosure executes processing according to the processing data associated with jig identification information acquired from a jig of the processing data accumulated in the processing data accumulating part, and thus it is not necessary for the worker to extract processing data suitable for the jig from the processing data accumulated in the processing data accumulating part, and convenience can be enhanced.

The processing system of the present disclosure may further include a processing data accumulating part capable of accumulating a plurality of pieces of the processing data, in which in a case where specification of any processing data accumulated in the processing data accumulating part and acquisition of the jig identification information from the jig by the information acquiring part are executed, the incompatibility notifying part may notify the incompatibility when the jig identification information associated with the specified processing data and the jig identification information acquired from the jig by the information acquiring part do not match.

With this configuration, the processing system of the present disclosure notifies incompatibility between the processing data and the jig when the jig identification information associated with the specified processing data and the jig identification information acquired from the jig do not match among the processing data accumulated in the processing data accumulating part, and thus can prevent processing using a jig that is not suitable for processing data which the worker desires the execution of processing.

In the processing system of the present disclosure, in a case where specification of any processing data accumulated in the processing data accumulating part and acquisition of the jig identification information from the jig by the information acquiring part are executed, the processing apparatus may execute processing according to the specified processing data when the jig identification information associated with the specified processing data and the jig identification information acquired from the jig by the information acquiring part match.

With this configuration, the processing system of the present disclosure executes processing when the jig identification information associated with the specified processing data and the jig identification information acquired from the jig match among the processing data accumulated in the processing data accumulating part, and thus can execute processing using a jig that is suitable for processing data which the worker desires the execution of processing.

In the processing system of the present disclosure, the processing data may be associated with a final processing number as a final number of workpieces to be processed by the processing apparatus, the processing system may include a jig database indicating a maximum supporting number as a maximum number of workpieces supportable by the jig for each type of jig in association with the jig identification information, and a number notifying part that notifies the final processing number and the maximum supporting number, and in a case where the jig identification information is acquired from the jig by the information acquiring part, the number notifying part may notify the final processing number associated with the processing data used by the processing apparatus for processing and the maximum supporting number indicated by the jig database in association with the jig identification information acquired from the jig by the information acquiring part when the processing apparatus executes processing according to the processing data.

With this configuration, in a case where the jig identification information is acquired from the jig, the processing system of the present disclosure notifies the final processing number associated with the processing data used by the processing apparatus for processing and the maximum supporting number indicated by the jig database in association with the jig identification information acquired from the jig when the processing apparatus executes processing according to the processing data, and thus can facilitate the prediction of work by the worker.

In the processing system of the present disclosure, the incompatibility notifying part may notify the incompatibility by a device provided in the jig.

With this configuration, the processing system of the present disclosure notifies the incompatibility between the processing data and the jig with a device provided in the jig itself, and thus can increase the possibility of having the incompatibility between the processing data and the jig recognized by the worker who sets the jig in the processing apparatus.

In the processing system of the present disclosure, the information acquiring part may acquire the jig identification information from the jig by wireless communication or wired communication.

With this configuration, the processing system of the present disclosure acquires the jig identification information from the jig by wireless communication or wired communication, and thus can facilitate the acquisition of the jig identification information from the jig and can enhance convenience.

The processing system of the present disclosure can suppress the execution of processing in a state in which the processing data and the jig are incompatible.

BRIEF DESCRIPTION OF THE DRAWINGS

FIG. 5 is a view showing an example of a jig database shown in FIG. 4.

FIG. 6 is a view showing an example of an order status database shown in FIG. 4.

DESCRIPTION OF EMBODIMENTS

Hereinafter, an embodiment of the present disclosure will be described with reference to the drawings.

First Embodiment

First, the configuration of a processing system according to the present embodiment will be described.

Figure 1:
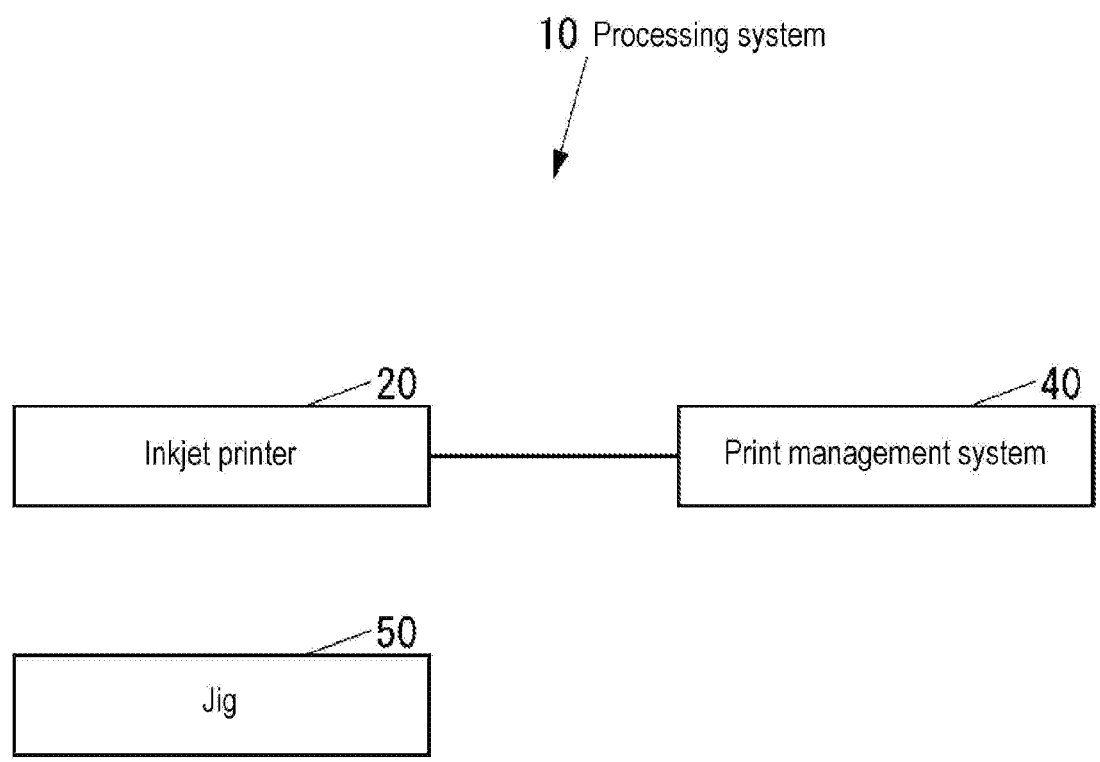
FIG. 1 is a block diagram of a processing system according to a first embodiment of the present disclosure.

FIG. 1 is a block diagram of a processing system 10 according to the present embodiment.

As shown in FIG. 1, the processing system 10 includes an inkjet printer 20 which is a processing apparatus that executes printing serving as processing on a workpiece according to print data serving as processing data, and a print management system 40 that manages printing by the inkjet printer 20.

The inkjet printer 20 and the print management system 40 are communicably connected directly in a wired or wireless manner through a network such as a local area network (LAN), the Internet, or the like or without the network.

The print management system 40 may be configured by a single computer or may be configured by a plurality of computers.

The processing system 10 includes a jig 50 that supports a workpiece and is set on the inkjet printer 20. In addition to the jig 50, the processing system 10 can include at least one jig having the same configuration as the jig 50.

Figure 2:
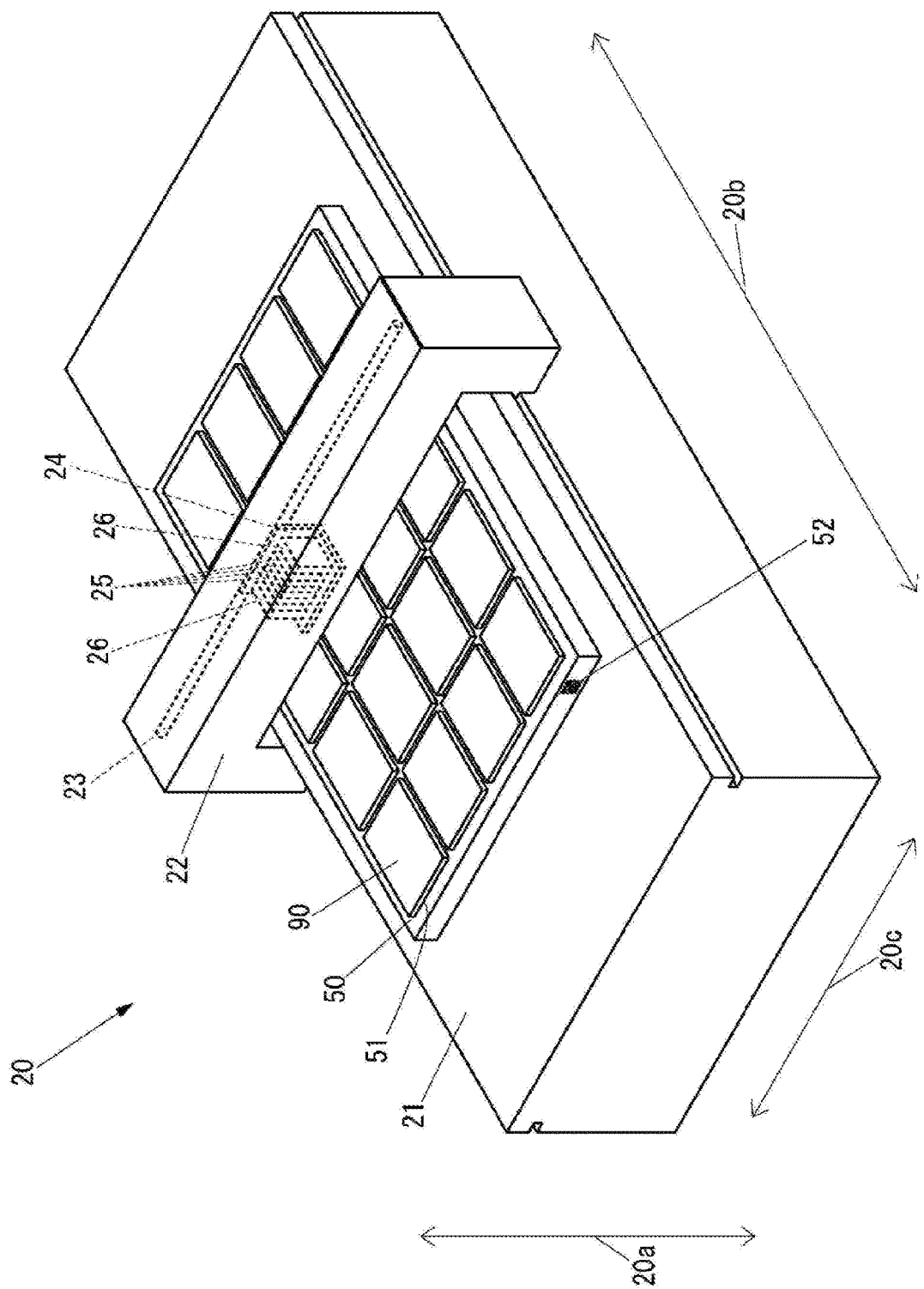
FIG. 2 is an outer appearance perspective view of an inkjet printer shown in FIG. 1.

FIG. 2 is an outer appearance perspective view of the inkjet printer 20.

As shown in FIG. 2, the inkjet printer 20 includes a flat bed 21 that supports a jig such as a jig 50 from the lower side in the perpendicular direction indicated by the arrow 20*a* and on which the jig can be positioned and set, and a printing part 22 that is arranged on the upper side in the perpendicular direction with respect to the flat bed 21 and that is supported to be movable with respect to the flat bed 21 in a front-back direction (hereinafter referred to as "sub-scanning direction") indicated by an arrow 20*b* orthogonal to the perpendicular direction.

The printing part 22 includes a guide rail 23 extending in a left-right direction (hereinafter referred to as "main scanning direction") indicated by an arrow 20*c* orthogonal to both the perpendicular direction and the sub-scanning direction, a carriage 24 which movement in the main scanning direction is guided by the guide rail 23, a plurality of inkjet heads 25 that eject ink toward a workpiece 90 supported by a jig set on the flat bed 21, and a plurality of light irradiation devices 26 that irradiate light toward the ink attached to the workpiece 90 supported by the jig set on the flat bed 21.

The inkjet head 25 and the light irradiation device 26 are mounted on the carriage 24.

The ink ejected by the inkjet head 25 is an ink that cures by being irradiated with light by the light irradiation device 26, and is, for example, a UV curable ink.

The light irradiation device 26 is, for example, a device that irradiates ultraviolet light with an LED (Light Emitting Diode).

Figure 3:
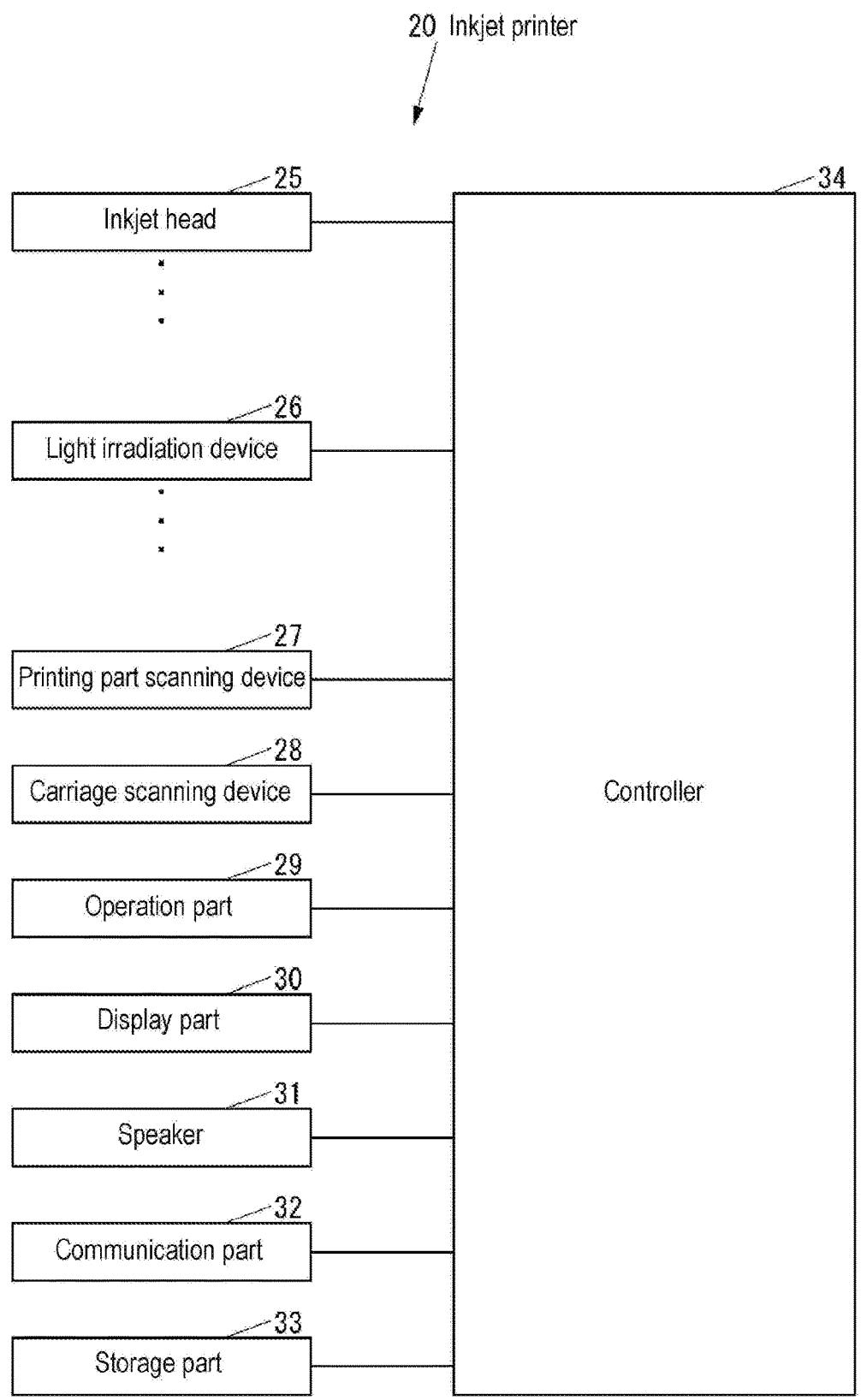
FIG. 3 is a block diagram of the inkjet printer shown in FIG. 2.

FIG. 3 is a block diagram of the inkjet printer 20.

As shown in FIG. 3, the inkjet printer 20 includes a plurality of inkjet heads 25, a plurality of light irradiation devices 26, a printing part scanning device 27 that moves the printing part 22 (see FIG. 2) in the sub scanning direction with respect to the flat bed 21 (see FIG. 2), a carriage scanning device 28 that moves the carriage 24 (see FIG. 2) with respect to the flat bed 21 in the main scanning direction along the guide rail 23 (see FIG. 2), an operation part 29 which is an input device such as a button, for example, to which various operations are input, a display part 30 which is a display device such as a liquid crystal display (LCD) for displaying various information, a speaker 31 which is an audio output device, a communication part 32 which is a communication device that communicates with an external device directly in a wired or wireless manner through a network or without the network, a storage part 33 which is a nonvolatile storage device such as a semiconductor memory and hard disk drive (HDD) that stores various information, and a controller 34 that controls the entire inkjet printer 20.

The controller 34 includes, for example, a central processing unit (CPU), a read only memory (ROM) that stores programs and various data, and a random access memory (RAM) used as a work region of the CPU of the controller 34. The CPU of the controller 34 executes the program stored in the ROM of the controller 34 or the storage part 33.

Figure 4:
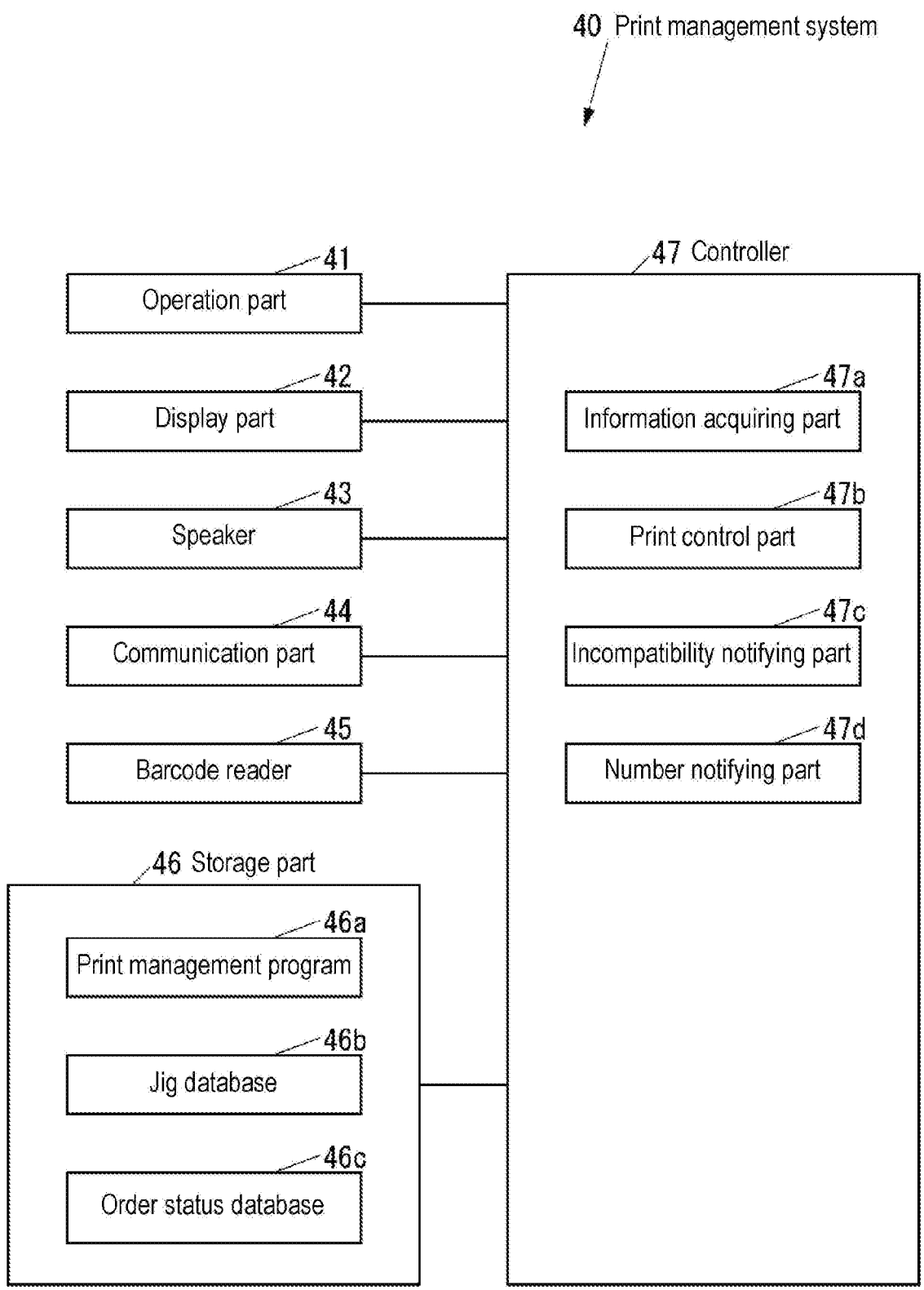
FIG. 4 is a block diagram of a print management system shown in FIG. 1 when configured by a single computer.

FIG. 4 is a block diagram of the print management system 40 when configured by a single computer.

As shown in FIG. 4, the print management system 40 includes an operation part 41 which is an input device such as a keyboard and a mouse to which various operations are input, a display part 42 which is a display device such as an LCD that displays various information, a speaker 43 which is an audio output device, a communication part 44 which is a communication device that communicates with an external device directly in a wired or wireless manner through a network or without a network, a barcode reader 45 that reads barcodes, a storage part 46 which is a nonvolatile storage device such as a semiconductor memory and an HDD that stores various information, and a controller 47 that controls the entire print management system 40.

The barcode reader 45 is, for example, a handy type.

The storage part 46 stores a print management program 46*a* for managing printing by the inkjet printer 20. For example, the print management program 46*a* may be installed in the print management system 40 at the time of manufacturing of the print management system 40, may be additionally installed in the print management system 40 from an external storage medium such as a Universal Serial Bus (USB) memory, a Compact Disk (CD), or a Digital Versatile Disk (DVD), or may be additionally installed in the print management system 40 from the network.

The storage part 46 stores a jig database 46*b* indicating jig information for each jig.

FIG. 5 is a view showing an example of the jig database 46*b*.

The jig database 46*b* shown in FIG. 5 includes, for each type of jig, jig identification information (hereinafter referred to as "jig ID") indicating the type of jig, size of the workpiece supported by the jig, maximum supporting number serving as the maximum number of workpieces that can be supported by the jig, vertical maximum supporting number serving as the maximum number of workpieces that can be supported by a jig in a specific direction in the jig (hereinafter referred to as "vertical direction"), and horizontal maximum supporting number serving as the maximum number of workpieces that can be supported by a jig in a direction (hereinafter referred to as "horizontal direction") orthogonal to the vertical direction in the jig. Here, the size of the workpiece includes a size in the vertical direction and a size in the horizontal direction. Furthermore, the maximum supporting number is a product of the vertical maximum supporting number and the horizontal maximum supporting number.

As shown in FIG. 4, the storage part 46 stores an order status database 46*c* indicating order status information indicating the status of an order for printing on a workpiece for each order.

FIG. 6 is a view showing an example of the order status database 46*c*.

According to the order status database 46*c* shown in FIG. 6, the order status information includes order ID which is the identification information of an order, print data for causing the inkjet printer 20 to realize target printing of the order, jig ID of a jig to be used to cause the inkjet printer 20 to realize target printing of the order, and a final processing number serving as the final number of workpieces scheduled to be printed by the inkjet printer 20. That is, the order status database 46*c* can accumulate a plurality of pieces of print data as processing data and configures a processing data accumulating part of the present disclosure. In FIG. 6, specific display of print data is omitted for the print data.

The controller 47 shown in FIG. 4 includes, for example, a CPU, a ROM that stores programs and various data, and a RAM that is used as a work region for the CPU of the controller 47. The CPU of the controller 47 executes the program stored in the ROM of the controller 47 or the storage part 46.

The controller 47 executes the print management program 46a to realize an information acquiring part 47a that acquires a jig ID from the jig, a print control part 47b that controls printing by the inkjet printer 20, an incompatibility notifying part 47c that notifies incompatibility between the print data and the jig, and a number notifying part 47d that notifies the final processing number and maximum supporting number.

Figure 7:
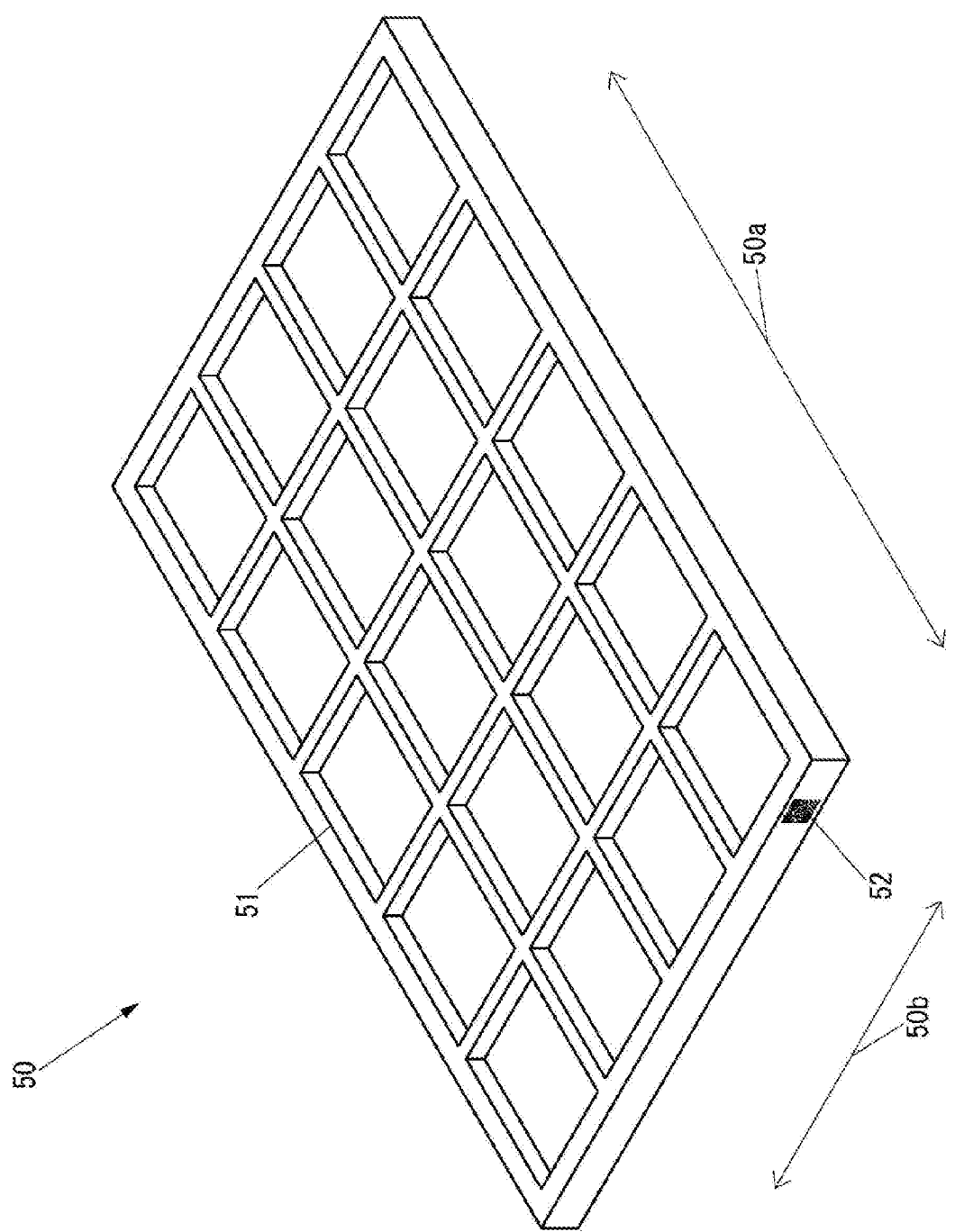
FIG. 7 is an outer appearance perspective view of the jig shown in FIG. 1.

FIG. 7 is an outer appearance perspective view of the jig 50.

As shown in FIG. 7, the jig 50 includes a plurality of supporting parts 51 for supporting the workpiece 90 (see FIG. 2), and a barcode 52 indicating the jig ID of the jig 50 itself. In the jig 50, the supporting parts 51 are arranged side by side in the vertical direction indicated by the arrow 50a by the vertical maximum supporting number, and are arranged side by side in the horizontal direction indicated by the arrow 50b by the horizontal maximum supporting number, and are arranged in total by the maximum supporting number. The barcode 52 may be a two-dimensional barcode such as, for example, a QR code (registered trademark) or a one-dimensional barcode. The barcode 52 may be attached to the main body of the jig 50 with a seal, or may be printed directly on the main body of the jig 50.

Next, the operation of the processing system 10 will be described.

First, the operation of the print management system 40 when registering jig information in the jig database 46b will be described.

The user of the print management system 40 can instruct the print management system 40 to register the jig information in the jig database 46b through the operation part 41 of the print management system 40 or the communication part 44 of the print management system 40 via an external computer (not shown). When instructed to register jig information in the jig database 46b, the controller 47 of the print management system 40 registers the information instructed to be registered in the jig database 46b in the jig database 46b.

Next, the operation of the print management system 40 when registering an order in the order status database 46c will be described.

When order including information such as print data, jig ID, final processing number and the like is input through the communication part 44, the controller 47 of the print management system 40 registers the input order in the order status database 46c. Here, the order may be input from, for example, a customer of a worker who performs printing using the inkjet printer 20.

Next, the operation of the processing system 10 when the barcode attached to the jig is read by the barcode reader 45 will be described.

A worker who performs printing using the inkjet printer 20 positions and sets a jig on the flat bed 21. Here, when the processing system 10 includes a plurality of types of jigs, the worker positions and sets one jig selected from the plurality of types of jigs on the flat bed 21. After positioning and setting the jig on the flat bed 21, the worker causes the barcode reader 45 to read the barcode attached to the jig set on the flat bed 21.

Figure 8:
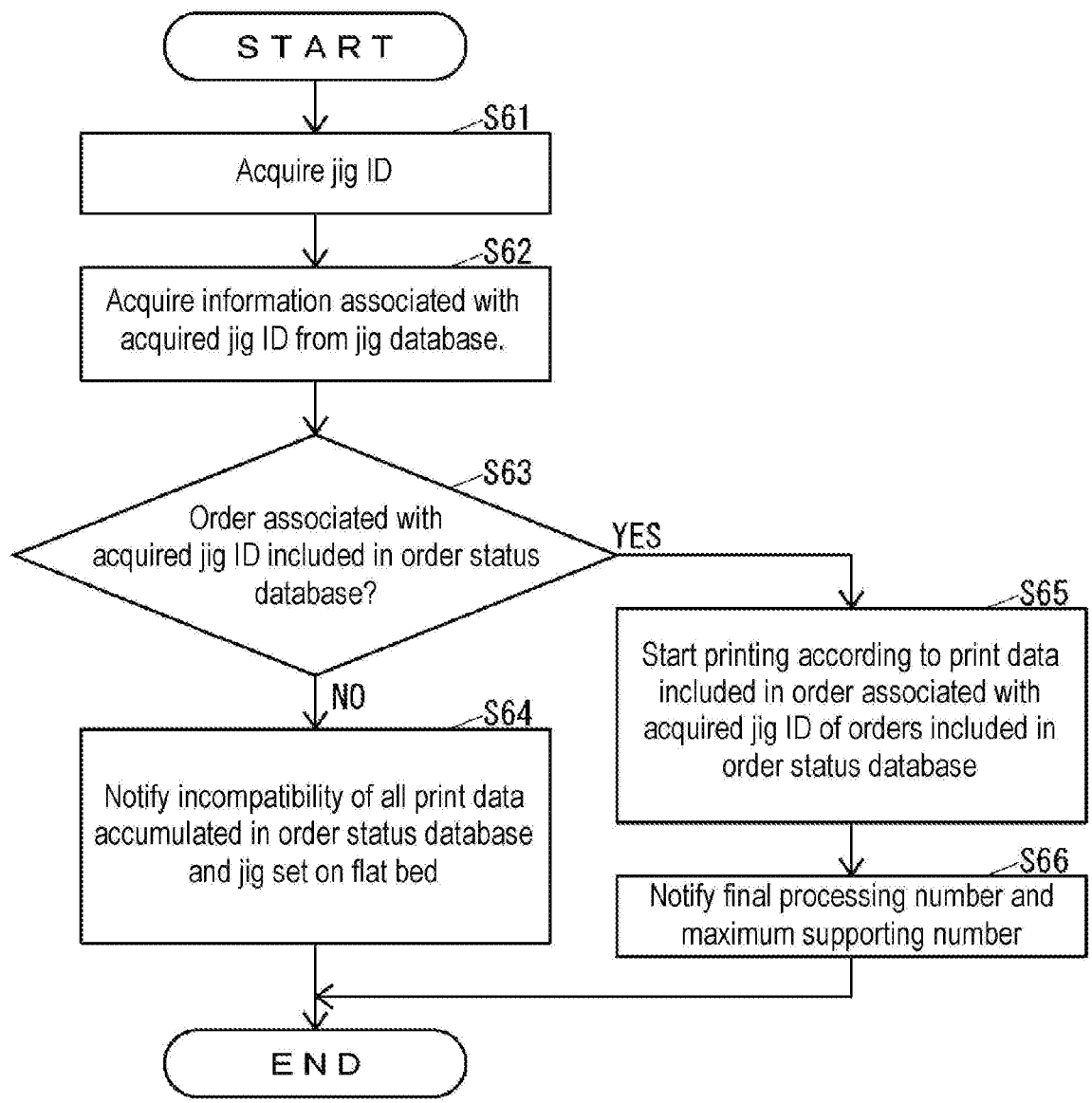
FIG. 8 is a flowchart of the operation of the print management system shown in FIG. 4 when the barcode attached to the jig is read by a barcode reader.

FIG. 8 is a flowchart of the operation of the print management system 40 when the barcode attached to the jig is read by the barcode reader 45.

When the barcode is read by the barcode reader 45, the controller 47 of the print management system 40 performs the operation shown in FIG. 8.

As shown in FIG. 8, the information acquiring part 47a acquires the jig ID indicated by the barcode read by the barcode reader 45 (S61).

Next, the print control part 47b acquires information associated with the jig ID acquired in S61 from the jig database 46b (S62).

Next, the print control part 47b determines whether or not the order associated with the jig ID acquired in S61 is included in the order status database 46c (S63). In other words, the print control part 47b determines whether or not the jig ID associated with the print data and the jig ID acquired from the jig in S61 match for all the print data accumulated in the order status database 46c.

When determining in S63 that the order associated with the jig ID acquired in S61 is not included in the order status database 46c, that is, that the jig ID associated with the print data and the jig ID acquired from the jig in S61 do not match for all the print data accumulated in the order status database 46c, the incompatibility notifying part 47c notifies, through display by the display part 42, the incompatibility between all the print data accumulated in the order status database 46c and the jig set on the flat bed 21 (S64), and terminates the operation shown in FIG. 8. The incompatibility notifying part 47c may include a message urging the worker to replace the jig set on the flat bed 21 with another type of jig in the notification in S64.

When determining in S63 that the order associated with the jig ID acquired in S61 is included in the order status database 46c, that is, that the jig ID associated with any print data accumulated in the order status database 46c and the jig ID acquired from the jig in S61 match, the print control part 47b starts printing according to the print data included in the order associated with the jig ID acquired in S61 of the orders included in the order status database 46c (S65).

When receiving the print data from the print management system 40 through the communication part 32, the controller 34 of the inkjet printer 20 executes printing based on the print data received through the communication part 32 with respect to the workpiece supported by the jig set on the flat bed 21. That is, the controller 34 moves the carriage 24 in the main scanning direction by the carriage scanning device 28, ejects ink toward the workpiece by the inkjet head 25, and irradiates the ink attached to the workpiece with light from the light irradiation device 26 to execute printing on the workpiece in the main scanning direction. Furthermore, when printing on the workpiece in the main scanning direction is executed, the controller 34 transports the printing part 22 in the sub scanning direction by the printing part scanning device 27, as necessary, thereby changing the position of printing with respect to the workpiece in the sub scanning direction, and thereafter executing printing with respect to the workpiece in the main scanning direction again.

After the process of S65, the number notifying part 47d notifies, through display by the display part 42, the final processing number included in the order status database 46c with respect to the order in which printing is currently being executed, and the maximum supporting number associated with the jig ID acquired in S61 in the jig database 46b (S66), and terminates the operation shown in FIG. 8.

As described above, when the jig ID associated with the print data and the jig ID acquired from the jig do not match (NO in S63), the processing system 10 notifies the incompatibility between the print data and the jig (S64), and thus can suppress the execution of printing in a state in which the print data and the jig are incompatible.

In a case where the jig ID is acquired from the jig (S61), when the jig ID associated with the print data and the jig ID acquired from the jig do not match for all the print data accumulated in the order status database 46c (NO in S63), the processing system 10 notifies the incompatibility between the print data and the jig (S64), and thus the worker can easily recognize that the jig should be replaced when incompatibility between the print data and the jig is notified, thus enhancing convenience.

The processing system 10 executes printing according to the print data associated with the jig ID acquired in S61 from the jig among the print data accumulated in the order status database 46c (S65), and thus the worker does not need to extract print data compatible with the jig from the print data accumulated in the order status database 46c, thus enhancing convenience.

When acquiring the jig ID from the jig (S61), and the inkjet printer 20 executes printing according to the print data (S65), the processing system 10 notifies the final processing number associated with the print data used for printing by the inkjet printer 20 and the maximum supporting number indicated in the jig database 46b in association with the jig ID acquired from the jig (S66), and thus prediction of work by the worker can be facilitated. For example, if the final processing number is 200 and the maximum supporting number is 20, the worker can recognize that the printing on the workpiece of the final processing number is terminated by causing the inkjet printer 20 to execute printing ten times using the target jig and can recognize when the printed workpiece is moved to a place for the next work of the printing work. Therefore, the worker can efficiently execute the work.

Figure 9:
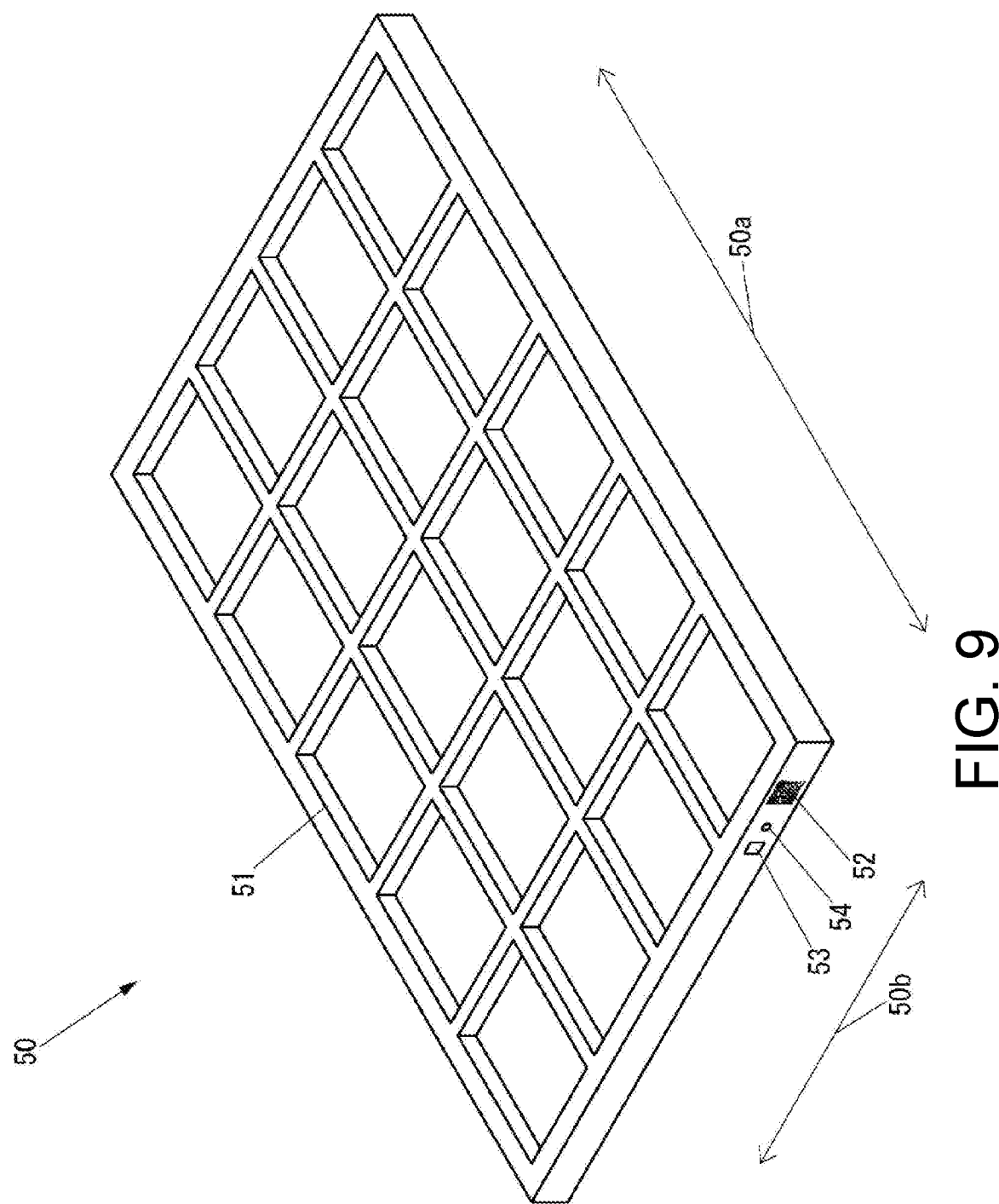
FIG. 9 is an outer appearance perspective view of a jig shown in FIG. 1 different from the example shown in FIG. 7.

In the present embodiment, the processing system 10 executes the notification in S64 through display by the display part 42 of the print management system 40. However, in place of the display by the display part 42 or in addition to the display by the display part 42, the processing system 10 may execute the notification in S64 by at least one of the display by the display part 30 of the inkjet printer 20, the audio output by the speaker 31 of the inkjet printer 20, the audio output by the speaker 43 of the print management system 40, the display by the display device of the jig, and the audio output by the audio output device of the jig. FIG. 9 is an outer appearance perspective view of a jig 50 different from the example shown in FIG. 7. The jig 50 shown in FIG. 9 includes a display part 53 which is a display device and a speaker 54 which is an audio output device in addition to the components of the jig 50 shown in FIG. 7. In the processing system 10, when notifying the incompatibility between the print data and the jig with a device provided in the jig itself, the possibility the incompatibility between the print data and the jig can be recognized by the worker who sets the jig on the inkjet printer 20 can be enhanced.

In the present embodiment, in the processing system 10, the barcode attached to the jig set on the flat bed 21 is read with the barcode reader 45 by the worker. However, the processing system 10 may be configured to automatically read the barcode of the jig when the jig is set on the flat bed 21.

In the processing system 10, in the present embodiment, the print management system 40 includes the barcode reader 45. However, in the processing system 10, the inkjet printer 20 may include a barcode reader that reads a barcode attached to a jig set on the flat bed 21.

In the present embodiment, the processing system 10 acquires the jig ID from the jig set on the flat bed 21 by reading a barcode attached to the jig set on the flat bed 21. However, the processing system 10 may acquire the jig ID from the jig through methods other than the barcode. For example, in the processing system 10, the jig may include a transmitter that transmits the jig ID by wireless communication or wired communication, and the inkjet printer 20 or the print management system 40 may include a receiver that receives the jig ID transmitted from the transmitter of the jig by wireless communication or wired communication. When acquiring the jig ID from the jig by wireless communication or wired communication, the processing system 10 can facilitate the acquisition of the jig ID from the jig, and can enhance convenience.

In the processing system 10, at least a part of the functions of the print management system 40 may be realized by the inkjet printer 20.

Second Embodiment

First, a configuration of a processing system according to a second embodiment of the present disclosure will be described.

Of the components of the processing system according to the present embodiment, the components similar to the components of the processing system 10 (see FIG. 1) according to the first embodiment are denoted with the same reference numerals as the components of the processing system 10, and the detailed description will be omitted.

Figure 10:
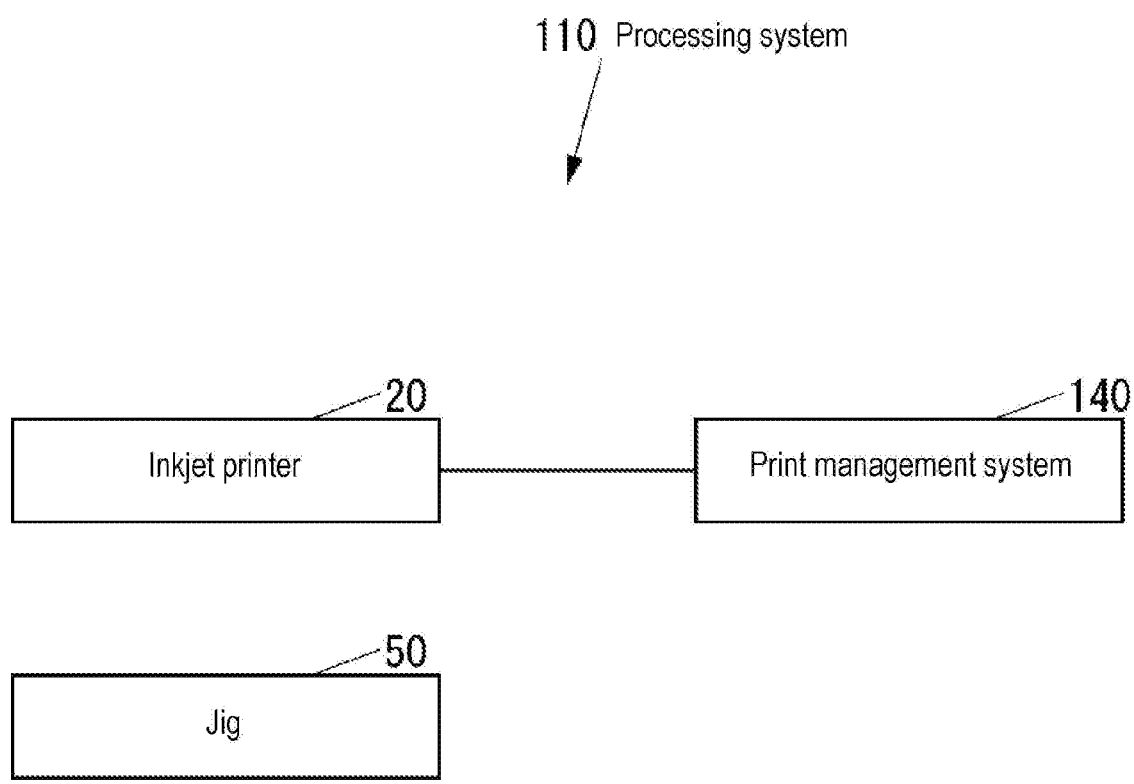
FIG. 10 is a block diagram of a processing system according to a second embodiment of the present disclosure.

FIG. 10 is a block diagram of a processing system 110 according to the present embodiment.

As shown in FIG. 10, the configuration of the processing system 110 is the same as the configuration in which the processing system 10 includes a print management system 140 instead of the print management system 40 (see FIG. 1). The print management system 140 may be configured by a single computer or may be configured by a plurality of computers.

Figure 11:
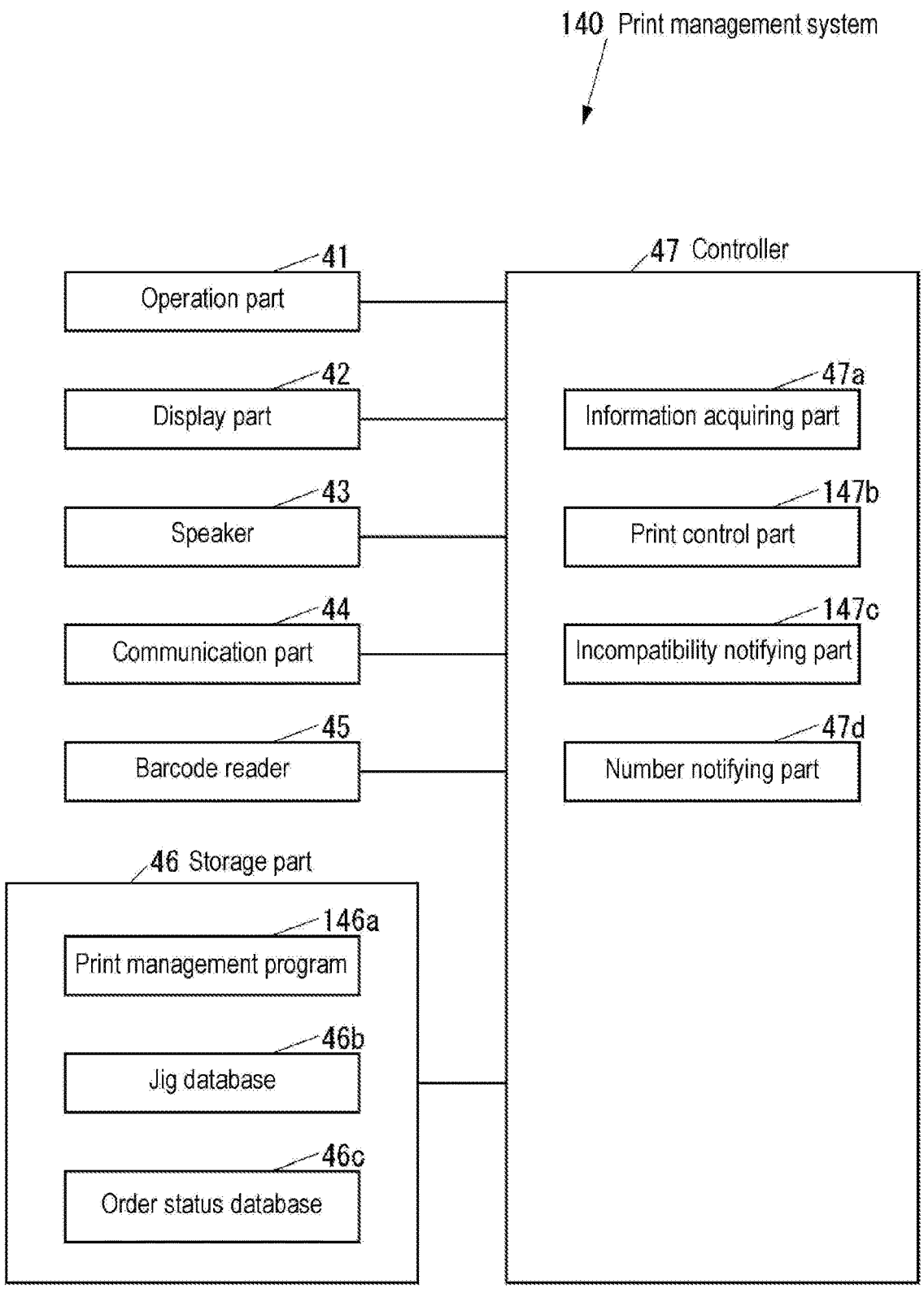
FIG. 11 is a block diagram of the print management system shown in FIG. 10 when configured by a single computer.

FIG. 11 is a block diagram of the print management system 140 when configured by a single computer.

As shown in FIG. 11, the configuration of the print management system 140 is the same as the configuration in which the print management system 40 includes a print management program 146a instead of the print management program 46a (see FIG. 4).

The controller 47 realizes the information acquiring part 47a and the number notifying part 47d, the print control part 147b that controls printing by the inkjet printer 20, and the incompatibility notifying part 147c that notifies incompatibility between the print data and the jig by executing the print management program 146a.

Next, the operation of the processing system 110 will be described.

Figure 12:
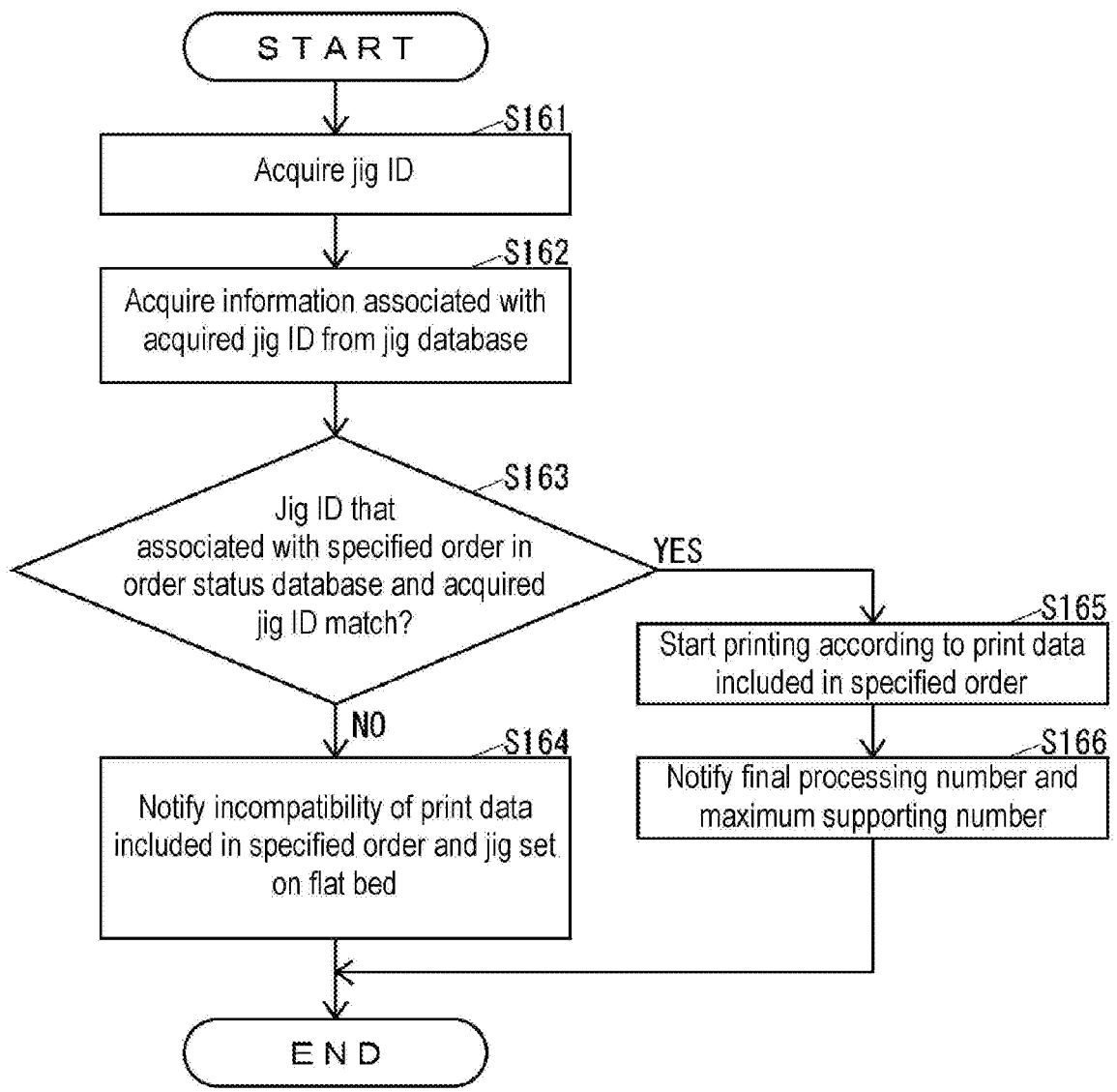
FIG. 12 is a flowchart of the operation of the print management system shown in FIG. 10 when the barcode attached to the jig is read by the barcode reader.

The operation of the processing system 110 is the same as the operation of the processing system 110 except that the operation shown in FIG. 12 is executed instead of the operation shown in FIG. 8.

FIG. 12 is a flowchart of the operation of the print management system 140 when the barcode attached to the jig is read by the barcode reader 45.

A worker who performs printing using the inkjet printer 20 specifies any order accumulated in the order status database 46c via the operation part 41 or the communication part 44. Next, the worker positions and sets the jig on the flat bed 21. Here, when the processing system 10 includes a plurality of types of jigs, the worker positions and sets one jig selected from the plurality of types of jigs on the flat bed 21. Note that any of specification of order and setting of jig may be executed first. After executing the specification of the order and the setting of the jig, the worker causes the barcode reader 45 to read the barcode attached to the jig set on the flat bed 21.

When the barcode is read by the barcode reader 45, the controller 47 of the print management system 140 executes the operation shown in FIG. 12.

As shown in FIG. 12, the information acquiring part 47a executes S161 similar to S61 (see FIG. 8).

Next, the print control part 147b executes S162 similar to S62 (see FIG. 8).

Next, the print control part 147b determines whether or not the jig ID associated with the specified order in the order status database 46c matches the jig ID acquired in S161 (S163).

When determining in S163 that the jig ID associated with the specified order in the order status database 46c does not match the jig ID acquired in S161, the incompatibility notifying part 147c notifies, through display by the display part 42, the incompatibility between the print data included in the specified order and the jig set on the flat bed 21 (S164), and terminates the operation shown in FIG. 12. The incompatibility notifying part 147c may include a message urging the worker at least one of replacing the jig set on the flat bed 21 with another type of jig or changing the specification of order in the notification in S164.

When determining in S163 that the jig ID associated with the specified order in the order status database 46c matches the jig ID acquired in S161, the print control part 147b starts printing according to the print data included in the specified order (S165).

After the process of S165, the number notifying part 47d executes S166 similar to S66 (see FIG. 8), and terminates the operation shown in FIG. 12.

As described above, when the jig ID associated with the print data and the jig ID acquired from the jig do not match (NO in S163), the processing system 110 notifies the incompatibility between the print data and the jig (S164), and thus the execution of printing in a state in which the print data and the jig are incompatible can be suppressed.

When the jig ID associated with the specified print data of the print data accumulated in the order status database 46c and the jig ID acquired from the jig do not match (NO in S163), the processing system 110 notifies the incompatibility between the print data and the jig (S164), and thus printing using a jig that is not compatible with the print data that the worker desires to execute printing can be prevented.

When the jig ID associated with the specified print data of the print data accumulated in the order status database 46c and the jig ID acquired from the jig match (YES in S163), the processing system 110 executes printing (S165), and thus printing using a jig that is compatible with the print data that the worker desires to execute printing can be executed.

In the present embodiment, the processing system 110 executes, through display by the display part 42 of the print management system 140, the notification in S164. However, in place of the display by the display part 42 or in addition to the display by the display part 42, the processing system 110 may execute the notification in S164 by at least one of the display by the display part 30 of the inkjet printer 20, the audio output by the speaker 31 of the inkjet printer 20, the audio output by the speaker 43 of the print management system 140, the display by the display device of the jig, and the audio output by the audio output device of the jig.

In the present embodiment, in the processing system 110, the barcode attached to the jig set on the flat bed 21 is read with the barcode reader 45 by the worker. However, the processing system 110 may be configured to automatically read the barcode of the jig when the jig is set on the flat bed 21.

In the processing system 110, in the present embodiment, the print management system 140 includes the barcode reader 45. However, in the processing system 110, the inkjet printer 20 may include a barcode reader that reads a barcode attached to a jig set on the flat bed 21.

In the present embodiment, the processing system 110 acquires the jig ID from the jig set on the flat bed 21 by reading a barcode attached to the jig set on the flat bed 21. However, the processing system 110 may acquire the jig ID from the jig by a method other than the barcode, similarly to the processing system 10 according to the first embodiment.

In the processing system 110, at least a part of the functions of the print management system 140 may be realized by the inkjet printer 20.

The processing of the present disclosure is inkjet printing using UV curable ink in each of the embodiment described above, but may be printing other than inkjet printing using UV curable ink, for example, processing other than printing such as cutting.

What is claimed is:

1. A processing system comprising:
a processing apparatus for performing processing on a workpiece according to processing data;
a jig that supports the workpiece and is set in the processing apparatus; and
a processor configured to notify an incompatibility between the processing data and the jig,
wherein
the jig includes a jig identification information that indicates a type of the jig itself,
the processor is configured to acquire the jig identification information from the jig,
the processing data is associated with the jig identification information, and
the processor is configured to notify the incompatibility when the jig identification information associated with the processing data does not match the jig identification information acquired from the jig by the processor;
wherein
the processing data is associated with a final processing number as a final number of workpieces to be processed by the processing apparatus,
the processing system includes:
a jig database, indicating a maximum supporting number as a maximum number of workpieces supportable by the jig for each type of jig in association with the jig identification information, and
the processor configured to notify the final processing number and the maximum supporting number, and
in a case where the jig identification information is acquired from the jig by the processor, the processor notifies the final processing number associated with the processing data used by the processing apparatus for processing and the maximum supporting number indicated by the jig database in association with the jig identification information acquired from the jig by the processor, when the processing apparatus executes processing according to the processing data.

2. The processing system according to claim 1, further comprising:
a storage device configured to accumulate a plurality of pieces of the processing data, wherein
the processor notifies the incompatibility when, in a case where the jig identification information is acquired from the jig by the processor, the jig identification information associated with the processing data and the jig identification information acquired from the jig by the processor do not match with respect to all the processing data accumulated in the storage device.

3. The processing system according to claim 2, wherein
in a case where the jig identification information is acquired from the jig by the processor, the processing apparatus executes processing according to the processing data to which the jig identification information acquired from the jig by the processor is associated of the processing data accumulated in the storage device, when the jig identification information associated with any processing data accumulated in the storage device and the jig identification information acquired from the jig by the processor match.

4. The processing system according to claim 1, further comprising:
a storage device configured to accumulate a plurality of pieces of the processing data, wherein
in a case where specification of any processing data accumulated in the storage device and acquisition of the jig identification information from the jig by the processor are executed, the processor notifies the incompatibility when the jig identification information associated with a specified processing data and the jig identification information acquired from the jig by the processor do not match.

5. The processing system according to claim 4, wherein
in a case where specification of any processing data accumulated in the storage device and acquisition of the jig identification information from the jig by the processor are executed, the processing apparatus executes processing according to the specified processing data when the jig identification information associated with the specified processing data and the jig identification information acquired from the jig by the processor match.

6. The processing system according to claim 1, wherein the processor notifies the incompatibility by a device provided in the jig.

7. The processing system according to claim 2, wherein the processor notifies the incompatibility by a device provided in the jig.

8. The processing system according to claim 3, wherein the processor notifies the incompatibility by a device provided in the jig.

9. The processing system according to claim 4, wherein the processor notifies the incompatibility by a device provided in the jig.

10. The processing system according to claim 5, wherein the processor notifies the incompatibility by a device provided in the jig.

11. The processing system according to claim 1, wherein the processor acquires the jig identification information from the jig by wireless communication or wired communication.

12. The processing system according to claim 2, wherein the processor acquires the jig identification information from the jig by wireless communication or wired communication.

13. The processing system according to claim 3, wherein the processor acquires the jig identification information from the jig by wireless communication or wired communication.

14. The processing system according to claim 4, wherein the processor acquires the jig identification information from the jig by wireless communication or wired communication.

* * * * *